United States Patent
Baker et al.

(10) Patent No.: US 9,319,115 B2
(45) Date of Patent: Apr. 19, 2016

(54) METHOD FOR PROVIDING PRECODING INFORMATION IN A MULTI-USER MIMO SYSTEM

(75) Inventors: Matthew P. J. Baker, Canterbury (GB); Timothy J. Moulsley, Caterham (GB); Filippo Tosato, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 964 days.

(21) Appl. No.: 12/597,018

(22) PCT Filed: Apr. 28, 2008

(86) PCT No.: PCT/IB2008/051632
§ 371 (c)(1),
(2), (4) Date: Oct. 22, 2009

(87) PCT Pub. No.: WO2008/132689
PCT Pub. Date: Nov. 6, 2008

(65) Prior Publication Data
US 2010/0118783 A1  May 13, 2010

(30) Foreign Application Priority Data
Apr. 30, 2007 (EP) .................................. 07301011

(51) Int. Cl.
*H04B 7/04* (2006.01)
*H04B 7/06* (2006.01)

(52) U.S. Cl.
CPC ............ *H04B 7/0417* (2013.01); *H04B 7/0452* (2013.01); *H04B 7/0632* (2013.01); *H04B 7/0634* (2013.01); *H04B 7/0639* (2013.01); *H04B 7/0665* (2013.01)

(58) Field of Classification Search
CPC ... H04B 7/0452; H04B 7/0456; H04B 7/0665
USPC .................................. 370/328, 334; 375/346
See application file for complete search history.

(56) References Cited

U.S. PATENT DOCUMENTS

| 6,292,917 B1 | 9/2001 | Sinha et al. |
| 2005/0101259 A1* | 5/2005 | Tong et al. ...................... 455/69 |

(Continued)

FOREIGN PATENT DOCUMENTS

| EP | 1758258 A2 * | 2/2007 | ............. H04B 1/707 |
| EP | 1775855 A1 | 4/2007 | |

(Continued)

OTHER PUBLICATIONS

Yongle Wu et al, "Multiuser MIMO Downlink Precoder Design Based on the Maximal SJNR Criterion", Global Telecommunications Converence, vol. 5, Nov. 28, 2005, pp. 2694-2698.

(Continued)

*Primary Examiner* — Guang Li
*Assistant Examiner* — Scott M Sciacca

(57) ABSTRACT

The present invention relates to a method for communicating in a network having a primary station and a plurality of secondary stations, said method comprising a step of, at the primary station, (a) configuring at least one downlink channel from the base station to a first secondary station, step (a) comprising (a1) signalling a first set of at least one parameter indicative of precoding applied to a first transmission from the base station to the first secondary station; (a2) signalling a second set of at least one parameter indicative of precoding applied to a second transmission from the base station to at least one second secondary station, wherein said step (a2) is carried out so that the second set of parameters contains less information than the first set of parameters.

13 Claims, 1 Drawing Sheet

(56) References Cited

U.S. PATENT DOCUMENTS

| | | |
|---|---|---|
| 2005/0254477 A1* | 11/2005 | Lee et al. ............... 370/342 |
| 2007/0097889 A1* | 5/2007 | Wang et al. ............. 370/281 |
| 2007/0098106 A1* | 5/2007 | Khojastepour et al. ... 375/267 |
| 2007/0110137 A1* | 5/2007 | Guess et al. ............. 375/148 |
| 2007/0223423 A1* | 9/2007 | Kim et al. ............... 370/334 |
| 2007/0280386 A1* | 12/2007 | Waes et al. .............. 375/347 |
| 2008/0008110 A1 | 1/2008 | Kishigami et al. |
| 2008/0076370 A1* | 3/2008 | Kotecha et al. .......... 455/187.1 |
| 2008/0225960 A1* | 9/2008 | Kotecha et al. .......... 375/259 |
| 2010/0067601 A1* | 3/2010 | Koslov et al. ........... 375/267 |
| 2010/0077275 A1* | 3/2010 | Yu et al. ................. 714/752 |

FOREIGN PATENT DOCUMENTS

| | | |
|---|---|---|
| JP | 2006005908 A | 1/2006 |
| WO | 2007030041 A2 | 3/2007 |
| WO | 2007046621 A1 | 4/2007 |

OTHER PUBLICATIONS

Lai-U Choi et al, "A Transmit Preprocessing Technique for Multiuser MIMO Systems Using a Decomposition Approach", IEEE Transactions on Wireless Communications, vol. 3, No. 1, Jan. 1, 2004, pp. 20-24.

* cited by examiner

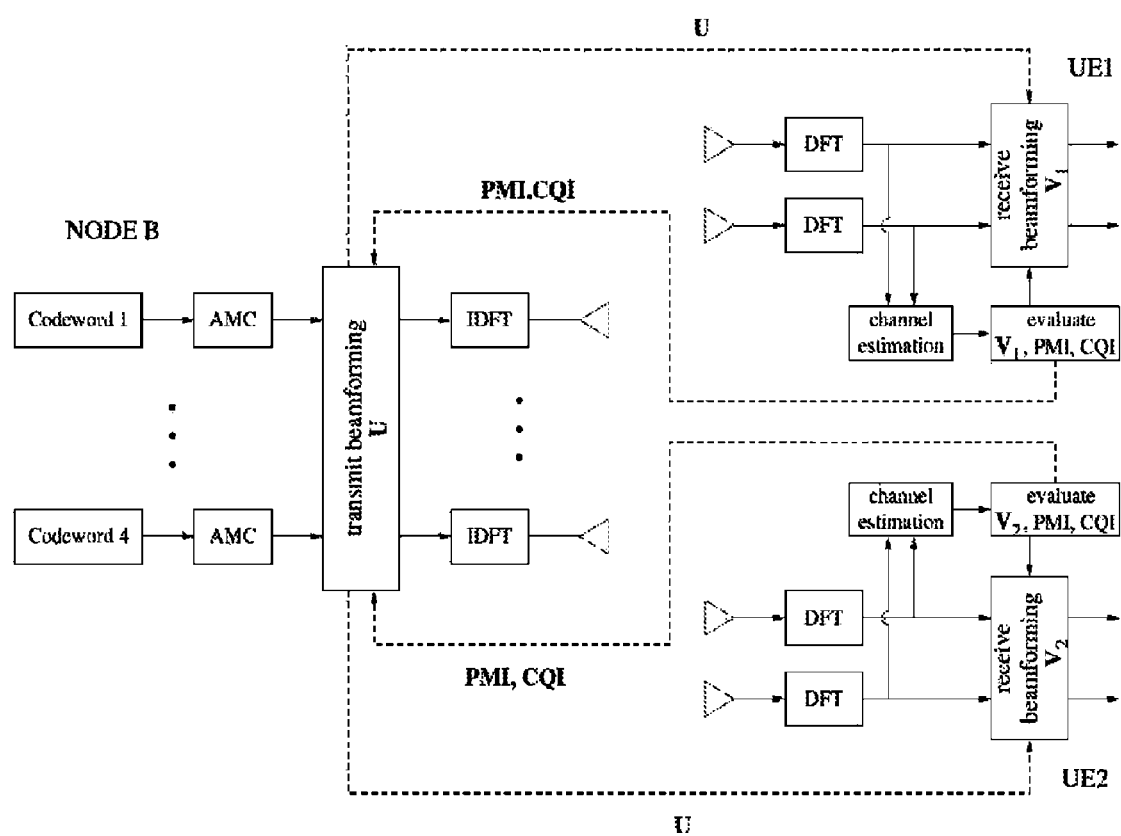

METHOD FOR PROVIDING PRECODING INFORMATION IN A MULTI-USER MIMO SYSTEM

FIELD OF THE INVENTION

The present invention relates to a method for communicating within a network.

BACKGROUND OF THE INVENTION

Multiple-input multiple-output (MIMO) is a technology for next generation wireless systems to enhance the capacity and robustness of the communication link. MIMO technology is based on the presence of multiple transmit antennas and multiple receive antennas in the communication link. Application of MIMO technology is envisioned for cellular communication, broadband wireless access, as well as for wireless local area networks (WLANs). A plurality of two or more transmit antennas is also referred to as an array of transmit antennas herein.

The benefits of MIMO communication are obtained through a combination of antenna arrays that provide spatial diversity from the propagation channel and algorithms that can adapt to the changing multivariate channel.

In future mobile systems and in the long-term evolution of the Universal Mobile Telecommunication System (UMTS LTE) the use of multiple-antenna techniques will become increasingly important to meet spectral efficiency requirements. A significant gain in spectral efficiency can be achieved in a downlink transmission by multiplexing multiple codewords in the spatial domain to either a single user or multiple users sharing the same time-frequency resource block. These single-user or multi-user MIMO schemes exploiting the multiplexing gain of multi-antenna transmission are sometimes referred to as spatial division multiplexing (SDM) and spatial division multiple access (SDMA) techniques. An SDMA scheme enables multiple users within the same radio cell to be accommodated on the same frequency or time slot. The realization of this technique can be accomplished by using an antenna array, which is capable of modifying its time, frequency, and spatial response by means of the amplitude and phase weighting and an internal feedback control.

Beamforming is a method used to create a radiation pattern of the antenna array by constructively adding the phases of the signals in the direction of the communication targets (terminal devices) desired, and nulling the pattern of the communication targets that are undesired or interfering.

In this context, the beamforming vector plays an important role. For purposes of illustration of the meaning of the beamforming vector, in an exemplary single-user communication system employing transmit beamforming and receive combining, assuming that signalling is done using M transmit and N receive antennas, the input-output relationship of this communication system is given by $$y = z^H H w x + z^H n$$

where H is a N×M channel matrix connecting the transmitter and the receiver, z is the receive combining vector, $z^H$ is its Hermitian transpose, w is the transmit beamforming vector, x is the transmitted symbol from a chosen constellation, and n is independent noise added at the receiver.

One of the challenges in the design of the beamforming vectors for SDM and SDMA techniques is the need for the base station to know the channels for all the users and receiving antennas of each user. This would require a large amount of feedback to be signalled from the users to the base station.

Solutions have been proposed to reduce this signalling information by introducing a codebook of few possible beamforming matrices. Each user then applies a greedy procedure to select one or more preferred beamforming vectors out of the codebook, by evaluating the Signal-to-Noise-Ratios (SINRs) of different beamforming combinations. Thus, each user has to signal one or several indexes of the preferred vector or vectors, respectively, plus one or more Channel-Quality-Indicator (CQI) values, indicating the corresponding SINRs.

An issue with codebook-based solutions is that the beamforming vectors are not jointly optimized according to the channel conditions. The base station uses the feedback information from the users only to schedule transmission to the set of users reporting the best CQI values.

Alternatively, significant gain in the cell throughput can be achieved if the base station could implement an ad-hoc design of the beamformer. This is possible, for example, if the users report all the channel coefficients, after some quantization operation. However, this requires signalling as many complex values as the product, MN, between the number M of transmit antennas and the number N of receive antennas per user.

Similarly, a solution to this problem based on channel quantization and zero forcing beamforming is described in "Transform-Domain Feedback Signalling for MIMO Communication" in the applicant patent application having reference PH006732EP4.

Another approach is PU2RC (per-user unitary rate control)

In FIG. 1 a block diagram is drawn of the fundamental operations carried out at the transmitter (Node B) and receivers (UE's) in a typical multi-user downlink MIMO scheme for which the present invention applies. The method described here is used to reduce the number of bits required to signal the precoding matrix U from the Node B to each UE selected for transmission.

FIG. 1 is a Block diagram of the downlink multi-user MIMO operations carried out at the transmitter and receivers. The AMC block performs adapatation of modulation and coding for each apatial stram to be transmitted. The feedback from each UE consists of a PMI (precoding matrix indicator) index selected from a codebook of vectors and a real-valued CQI (channel quality indicator), which is an estimate of the SINR for the relevant received spatial stream. The precoding matrix, which may be determined based on PMI and CQI feedback from UEs, modifies the spatial response of the transmitting antenna array. This precoding matrix may vary in the time and/or frequency domain.

The feedback from the Node B conveys quantised information on the vectors forming the precoding matrix U. This feedback from the Node B is the subject of the present invention.

In order to build the optimum receiver, it is necessary to know the precoding vectors used by the base station for all simultaneously-scheduled users. This enables a receiver with multiple receive antennas to derive the phase reference for its own data as well as to compute combining coefficients for rejection of interference from the signals for other users.

However, this results in a very large downlink signalling overhead.

SUMMARY OF THE INVENTION

It is an object of the invention to propose a method for signaling to the secondary station the precoding used for the other neighboring secondary stations.

Another object of the invention is to propose a method for signaling to a considered secondary station the precoding coefficient corresponding to all secondary station without creating too much overhead.

To this end, according to a first aspect of the invention, it is proposed a method for communicating in a network having a primary station and a plurality of secondary stations, said method comprising a step of, at the primary station, (a) configuring at least one downlink channel from the base station to a first secondary station, step (a) comprising (a1) signalling a first set of at least one parameter substantially representative of precoding applied to a first transmission from the base station to the first secondary station;

(a2) signalling a second set of at least one parameter substantially representative of precoding applied to a second transmission from the base station to at least one second secondary station, wherein said step (a2) is carried out so that the second set of parameters contains less information than the first set of parameters.

As a consequence, a considered secondary station will have an information about its own precoding with good accuracy, and at least an estimation of the precoding used for the other secondary stations. This estimation or less accurate information permits to the considered secondary station to carry out an active interference rejection based on this information.

Moreover, the reduced information permits not to increase to much the overhead caused by this signaling.

The present invention also relates to a base station and to a secondary station carrying out this method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram representing the fundamental operations carried out at the transmitter (Node B) and receivers (UE's) in a typical multi-user downlink MIMO scheme for which the present invention applies.

DETAILED DESCRIPTION OF THE INVENTION

The present invention relates to a method of communicating from a primary station to a secondary station. Such a primary station can be a base station or a NodeB. Such a secondary station can be a mobile station or a user equipment.

According to the signalling aspect of the invention, it is recognised that the most important purpose of the above downlink signalling (e.g. in terms of improving performance or total throughput) is providing sufficient information for the receiver to derive the precoding vector used for its own data. Further improved performance may be gained by interference rejection using some knowledge of the precoding vectors for other users, but this is not the primary goal that the said downlink signalling must accomplish.

Therefore according to the signalling aspect of the invention, the amount of information provided pertaining to the precoding vector of the user's own data is greater than the amount of information provided pertaining to other simultaneously-used precoding vectors.

The former said amount of information may for example be greater in terms of having a finer resolution, more frequent update rate, finer frequency-domain granularity . . . .

According to the invention, a primary station computes the precoding for each secondary station for which data is to be sent. Once the precoding has been computed, this can be for instance estimated (e.g. by quantization) or translated into a transform domain, by applying a transform on this precoding. Then, for each considered secondary station, the primary station signals the precoding to be applied by this considered secondary station and an information related to the precoding that will be used for the remaining secondary stations. This information is less accurate or contains less data. This can be done by several different ways. For instance, the number of bits used for this information can be reduced compared with the number of bits used for signaling the precoding of the considered secondary station.

In another example, the information concerning the other secondary station comprises an update rate of at least one parameter in the second set of parameters having an update rate lower than a corresponding parameter in the first set of parameters. In another example, this can be done by having a vector quantization granularity of the at least one parameter in the set of parameters for the remaining secondary stations being coarser than the vector quantization granularity of a corresponding parameter in the first set of parameters. It is also possible to do a quantization for the two types of information wherein the quantization step size of at least one parameter in the set of parameters concerning the remaining secondary stations having a larger step size than a corresponding parameter in the set of parameters related to the considered secondary station.

In an embodiment of the invention, the sets of parameters corresponding to the considered secondary station and the remaining secondary stations, and that will be transmitted to the considered station, include parameters indicative of frequency domains allocated respectively to the considered secondary station and to the remaining secondary stations. In such a case, the frequency domain granularity of at least one frequency domain indicated by the set of parameters related to the considered secondary station can be finer than the frequency domain granularity of a corresponding frequency domain indicated in the set of parameters for the rest of the secondary stations.

In another example of the invention, more error protection is applied to the transmission to the parameters in the set of parameters regarding the considered secondary station than to a corresponding parameter in the set of parameters regarding the remaining secondary stations. For instance, the error protection can be made more frequently or with more bits for the considered station.

In still another example of the invention, a higher transmission power or a larger number of antennas is used for the transmission of parameters in the set of parameters concerning the considered station, compared with the transmission power or the number of antennas for transmission of a corresponding parameter in the set of parameters related to the rest of secondary station.

These examples can be seen independently or can be advantageously combined to obtain a more reduced overhead.

The method of any of the preceding claim, wherein the first transmission and the second transmission are simultaneous.

According to the invention, each secondary station receives the two sets of precoding parameters regarding itself and the other secondary stations.

Then, the primary station transmits for instance in parallel, i.e. simultaneously data to all the secondary stations by means of the computed corresponding precoding parameters. Each secondary station receiving data from the primary station will then decode data with help of the first precoding parameters and can optionally rejects interference with help of the other precoding parameters regarding the remaining secondary stations. This can be done depending on the values of the parameters, for instance if the precoding parameters of the remaining secondary stations are indicating a preferred narrow direction.

The invention claimed is:

1. A method for communicating in a network having a primary station and a plurality of secondary stations, the method comprising:

in the primary station:
modifying the transmission of at least one downlink channel from the primary station to a first secondary station, wherein the modification comprises:
transmitting to the first secondary station, a first set of at least one parameter with the value of the at least one parameter selected by the primary station and representative of a first pre-coding applied to a first transmission from the primary station to the first secondary station, wherein the primary station determines the first set at least one parameter to be signaled to the first secondary station;
transmitting to the first secondary station, a second set of at least one parameter substantially representative of a second pre-coding applied to a second transmission from the primary station to at least one second secondary station other than said first secondary station, wherein the step of transmitting the second set of at least one parameter to the first secondary station is carried out so that the second set of at least one parameter are less accurate or contain fewer bits than the first set of at least one parameter, wherein the primary station determines the second set of at least one parameter to be signaled to the first secondary station, and
wherein a vector quantization granularity of the at least one parameter in the second set of parameters transmitted to the at least one other second secondary station is coarser than the vector quantization granularity of a corresponding parameter in the first set of parameters transmitted to the first secondary station.

2. The method of claim 1, wherein an update rate of at least one parameter in the second set of the at least one parameter has an update rate lower than a corresponding parameter in the first set of parameters.

3. The method of claim 1, wherein a quantization step size of the at least one parameter in the second set of the at least one parameter has a larger step size than a corresponding parameter in the first set of parameters.

4. The method of claim 1, wherein the first and second sets of the at least one parameter includes parameters indicative of frequency domains allocated respectively to the first secondary station and to the at least one second secondary station, and wherein the frequency domain granularity of the at least one frequency domain indicated by the first set of parameters is finer than the frequency domain granularity of a corresponding frequency domain indicated in the second set of parameters.

5. The method of claim 1, wherein a greater number of bits is used to represent at least one parameter in the first set of parameters than the number of bits used to represent a corresponding parameter in the second set of parameters.

6. The method of claim 1, wherein more error protection is applied to the transmission to at least one parameter in the first set of parameters than to a corresponding parameter in the second set of the at least one parameter.

7. The method of claim 1, wherein a higher transmission power is used for the transmission of at least one parameter in the first set of parameters than for transmission of a corresponding parameter in the second set of the at least one parameter.

8. The method of claim 1, wherein a larger number of antennas is used for the transmission of the at first set of the least one parameter than for the second set of at least one parameter.

9. The method of claim 1, wherein the first transmission and the second transmission are simultaneous.

10. The method of claim 1, further comprising at the first secondary station, receiving the first and second sets of the at least one parameter, and at the primary station, transmitting in parallel data to the first secondary station and to second secondary station by means of the first pre-coding parameters and the second pre-coding parameters respectively.

11. The method of claim 10, further comprising at the first secondary station:
receiving data from the primary station,
rejecting interference with help of the second set of the at the least one parameter, and
decoding data with help of the first pre-coding parameters.

12. A primary station comprising:
a transmitter configured to transmit to a plurality of secondary stations,
a controller configured to modify the transmission of at least one downlink channel from the primary station to a first secondary station,
the transmitter transmitting a first set of at least one parameter with the values of the first set of the at least one parameter selected by the primary station and representative of pre-coding applied to the first transmission to the first secondary station, wherein the primary station determines the at least one parameter to be transmitted to the first secondary station;
the transmitter transmitting a second set of at least one parameter substantially representative of pre-coding applied to a second transmission to at least one second secondary station, wherein the primary station determines the second set of at least one parameter to be transmitted to the first secondary station;
wherein the transmitter is arranged so that the second set of at least one parameter is less accurate or contains fewer bits than the first set of at least one parameter; and
wherein a vector quantization granularity of the at least one parameter in the second set of parameters transmitted to the at least one other second secondary station is coarser than the vector quantization granularity of a corresponding parameter in the first set of parameters transmitted to the first secondary station.

13. A first secondary station comprising:
a receiver including an antenna array including a plurality of antennas receiving a first transmission from a primary station, whereby the primary station also transmits a second transmission to at least one second secondary station, said first secondary station comprising:
the receiver receiving from the primary station either a first signaling message comprising a first set of at least one parameter selected by the primary station and representative of pre-coding applied to the first transmission from the primary station to the first secondary station; or otherwise
the receiver receiving from the primary station a second signaling message comprising a second set of at least one parameter substantially representative of pre-coding applied to I the second transmission from the primary station to the second secondary station, wherein the first and second signaling messages are determined by the primary station;

wherein said the second set of at least one parameter has less accuracy or contains fewer parameters or contains fewer bits than the first set of at least one parameter; and wherein a vector quantization granularity of the at least one parameter in the second set of parameters transmitted to the at least one other second secondary station is coarser than the vector quantization granularity of a corresponding parameter in the first set of parameters transmitted to the first secondary station.

\* \* \* \* \*